[19] United States Patent
Martorella

[11] Patent Number: 5,000,404
[45] Date of Patent: Mar. 19, 1991

[54] AIRCRAFT PRECISION APPROACH CONTROL SYSTEM

[75] Inventor: Romeo P. Martorella, Dix Hills, N.Y.

[73] Assignee: Grumman Aerospace Corporation, Bethpage, N.Y.

[21] Appl. No.: 347,486

[22] Filed: May 4, 1989

Related U.S. Application Data

[63] Continuation-in-part of Ser. No. 85,461, Aug. 13, 1987, abandoned.

[51] Int. Cl.$^5$ .................... B64C 3/16; G05D 1/00
[52] U.S. Cl. .................... 244/188; 244/76 R; 244/183; 364/428; 364/435
[58] Field of Search ............... 244/188, 181, 183, 182, 244/194, 195, 186, 76 R; 364/428, 430, 433, 435; 318/583

[56] References Cited

U.S. PATENT DOCUMENTS

| | | |
|---|---|---|
| 3,265,333 | 8/1966 | Montooth . |
| 3,275,269 | 9/1966 | Yiotis . |
| 3,379,396 | 4/1968 | Patterson . |
| 3,586,268 | 6/1971 | Melvin .................... 244/188 |
| 3,591,110 | 4/1969 | Dramer et al. . |
| 3,604,908 | 9/1971 | Loome .................... 244/182 |
| 3,614,036 | 10/1969 | Foster . |
| 3,618,828 | 11/1971 | Klein .................... 244/188 |
| 3,627,238 | 12/1971 | Menn .................... 246/188 |
| 3,665,465 | 5/1972 | Miller .................... 244/188 |
| 3,686,626 | 8/1972 | Bateman .................... 364/428 |
| 3,691,356 | 9/1972 | Miller .................... 364/435 |
| 3,698,669 | 10/1972 | Miller .................... 244/182 |
| 4,027,839 | 6/1977 | Quinlivan . |
| 4,093,158 | 6/1978 | Clews .................... 364/435 |
| 4,209,152 | 6/1980 | Stephan . |
| 4,212,444 | 7/1980 | Stephan . |
| 4,245,805 | 1/1981 | Stephan . |
| 4,471,439 | 9/1984 | Robbins .................... 244/181 |

OTHER PUBLICATIONS

AIAA-83-2072 Carrier Landing Simulation Results of Flight Path Controllers in Manual and Automatic Approach.

Primary Examiner—Galen Barefoot
Attorney, Agent, or Firm—Scully, Scott, Murphy & Presser

[57] ABSTRACT

A precision approach control system designed to control the approach of an aircraft during landing to provide a more stable and easier mode of landing during critical landing situations, such as during the landing of an aircraft on an aircraft carrier. During operation, when the aircraft is subjected to vertical or horizontal winds or wind shear, the system controls the aircraft to maintain the inertial flight path angle constant which essentially defines operation in the precision approach control mode. In one disclosed embodiment, the precision approach control system changes the controller in the cockpit that is normally the pitch rate command stick controller during a Power Assist landing into a flight path angle rate controller. The autothrottle system for the aircraft is utilized to maintain the aircraft at a predetermined angle of attack during landing in the precision approach mode.

3 Claims, 3 Drawing Sheets

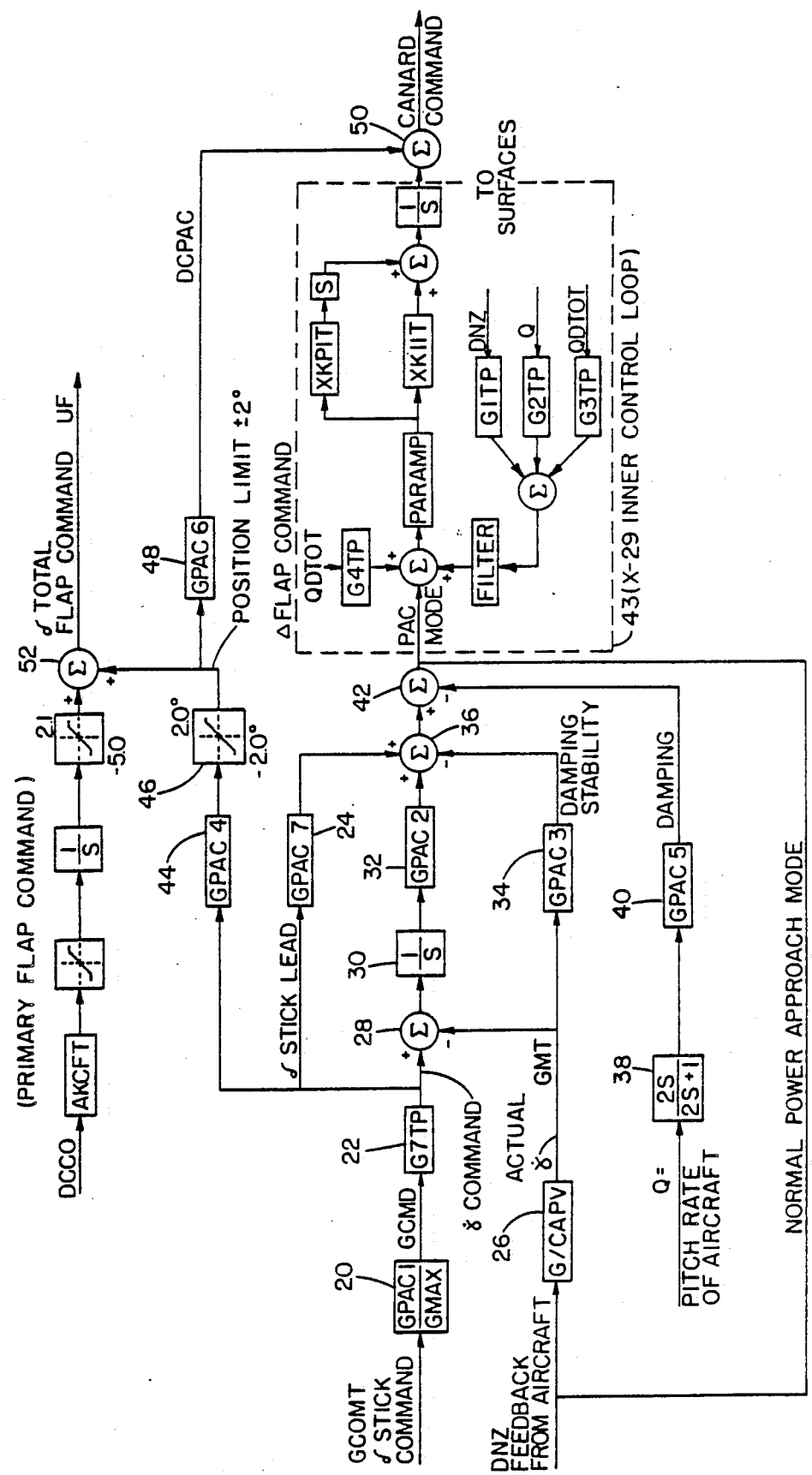
FIG. 2 (PAC OUTER LOOP)

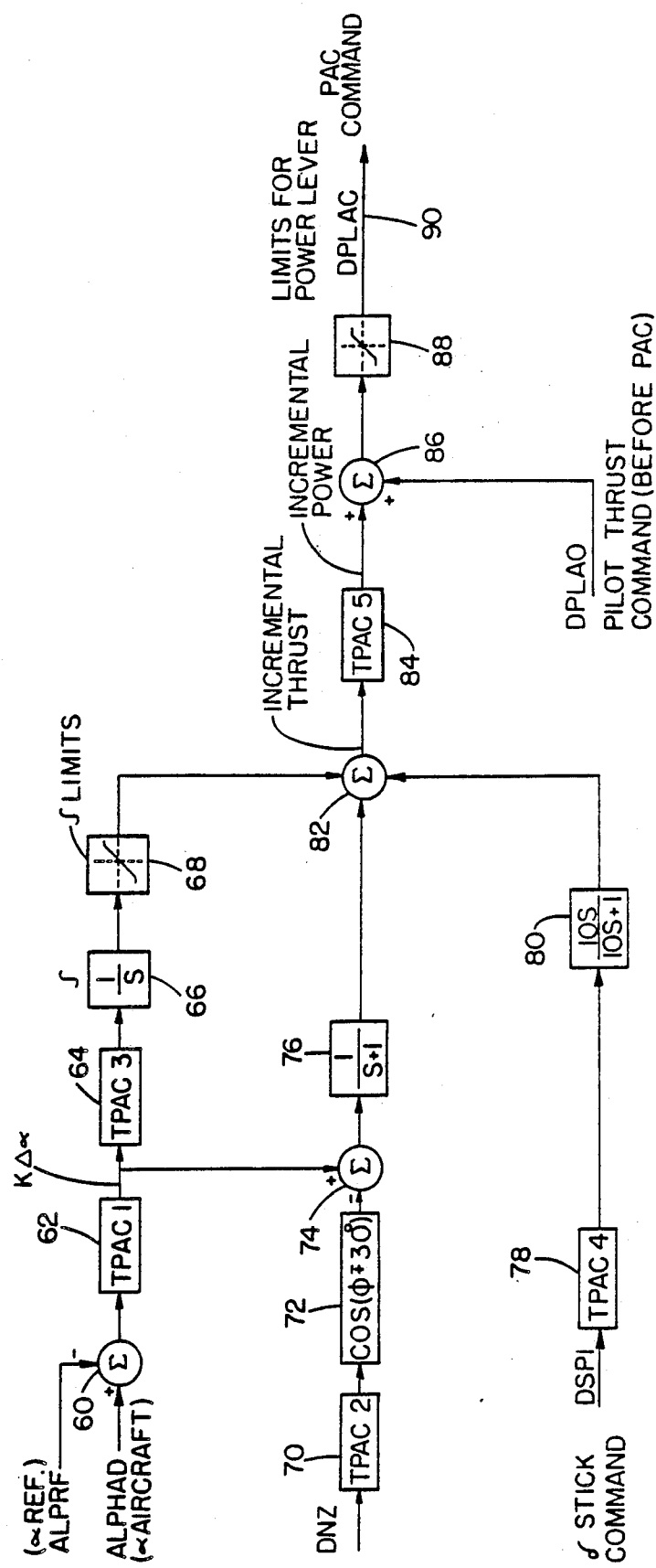
FIG.3 (PAC AUTOTHROTTLE)

AIRCRAFT PRECISION APPROACH CONTROL SYSTEM

This patent application is a continuation-in-part patent application of parent application Ser. No. 085,461, filed Aug. 13, 1987 now abandoned.

BACKGROUND OF THE INVENTION

1. Field of the Invention

The present invention relates generally to a Precision Approach Control (PAC) system for stabilizing an aircraft during landing thereof, such as during a relatively precise landing on an aircraft carrier, and more particularly pertains to a precision approach control system which provides the pilot with precise control over the rate of change of the flight path angle of the aircraft during landing. The precision approach control system also maintains the aircraft at a predetermined angle of attack during landing.

2. Discussion of the Prior Art

Precise control of the flight path of an aircraft should be maintained throughout a landing approach to an aircraft carrier, which makes this a very demanding task for a pilot. During such a landing, the pilot is presented with a relatively narrow landing window along an ideal glide slope path. The landing is further complicated by uncertain aircraft carrier motions and also by atmospheric and ship-induced turbulences.

The landing approach of high-performance, relatively unstable aircraft on an aircraft carrier is an even more demanding task, requiring precision control of the flight path by the pilot. The prior art has used Stability Augmentation Systems (SAS), Approach Power Compensators (APC), and Direct Lift Control (DLC) subsystems to augment the basic aircraft flying qualities and control systems, but using separate design criteria for each of these different subsystems. With the main objectives of these subsystems (short period response, phugoid damping, g control) achieved, the pilot is given improved control over the aircraft. However, in high-performance, relatively unstable aircraft requiring exceptional flight path control, this design methodology is generally insufficient since it does not assure precise flight path control.

However, none of the prior art approaches has resulted in an entirely satisfactory solution to the problem of providing a pilot with precise flight path control over an aircraft during a relatively critical landing thereof such as on an aircraft carrier.

Manual and Automatic Carrier Landing (ACL) designs resulting from an integrated approach to the flight path control problem, as well as the application of qualitative flight path control criteria, have achieved superior flight path response in a Grumman F-14 aircraft with minor modifications to its existing hardware, which has been demonstrated in studies and piloted simulations.

SUMMARY OF THE INVENTION

Accordingly, it is a primary object of the present invention to provide a precision approach control system or mode of operation for an aircraft which allows landing thereof in a more stable and easier manner than with existing and available control systems.

Improved control over an aircraft during landing should result in significantly enhanced flight safety and also in substantial savings in fuel since fewer bolters and wave-offs can be expected, which will result in fewer landing approaches. Fewer landing approaches combined with significantly enhanced aircraft control by the pilot should reduce the number of critical piloting situations, thereby significantly enhancing flight safety.

A further object of the subject invention is the provision of a precision approach control system for an aircraft which essentially provides the pilot with a flight path angle rate ($\dot{\gamma}$) controller, and which utilizes the autothrottle system to maintain the aircraft at a predetermined angle of attack ($\alpha$), thereby defining aircraft approach speed with landing weight. In one embodiment in the X-29 aircraft, the controller in the cockpit that is normally the pitch rate command stick controller during a Power Approach landing is converted into a flight path angle rate ($\dot{\gamma}$) controller. The precision approach control mode of the present invention provides true control of the inertial flight path and velocity vector of the aircraft, providing the pilot with rapid and precise flight path control over the aircraft during a landing approach. The precision approach control mode also uses the autothrottle control subsystem to maintain the aircraft at a predetermined angle of attack ($\alpha$) during landing, which in a particular disclosed embodiment for the X-29 aircraft was selected to be 8.75°, which defines the aircraft approach speed with weight. The predetermined angle of attack ($\alpha$) would normally be different for different types of aircraft, and could even be designed to be variable and selected by the pilot.

The precision approach control system or mode of operation of the present invention is designed to control the approach of an aircraft during landing to provide a more stable flight path and easier mode of landing, which is very important in critical landing situations, such as during the landing of an aircraft on an aircraft carrier or on a relatively short runway.

In operation of the precision approach control system, when the aircraft is subjected to vertical or horizontal winds or wind shear, the system controls the aircraft to maintain the inertial flight path angle constant, which essentially defines operation in the precision approach control mode.

One embodiment of the precision approach control system was designed for operation in an existing aircraft, the Grumman X-29, and the particular PAC system implemented therein used the existing controls and control subsystems onboard that aircraft. The Grumman X-29 aircraft is designed with three pilot-operated controllers, a throttle, a control command stick, and rudder pedal controls.

Disengagement of operation in the PAC mode will cause operation to revert to normal operation in the power approach mode. The precision approach control mode in the X-29 aircraft is designed to be capable of being overridden by the pilot by engaging the throttle controller with a force in excess of a given threshold force, such as above eight pounds. Moreover, the PAC mode of operation is designed to be disengaged by closure of weight-on-wheels switches on the aircraft, which indicates landing contact. Accordingly, it should be recognized that the PAC mode of operation of the present invention can be designed to be suspended by a higher priority operating system or subsystem or by the pilot.

In the precision approach control embodiment in the X-29 aircraft, the PAC mode of operation was designed to be engaged by first selecting a normal power approach mode of operation, then by engaging the autothrottle system, and then by engaging the PAC mode, with all engagements being by normal electrical switches in the cockpit. For engagement to be complete, several other conditions must exist within proper predefined limits, such as angle of attack probe data, attitude reference data, normal acceleration data, etc. The trim button is then operated to stabilize the rate-of-climb (descent) of the aircraft, which is shown on a needle gage, and additional trim control should not normally be required thereafter. This trim requirement is only required in the X-29 control arrangement embodiment, and alternative embodiments do not necessarily require this feature. The stick controller which is normally the pitch-command stick controller in the cockpit is then operated in the PAC mode by the pilot to control the rate of change of the flight path angle during the descent of the aircraft.

The present invention for a PAC system is designed to reduce pilot workload by minimizing aircraft flight path deviations caused by atmospheric disturbances, by maintaining a stable, trimmed approach airspeed, and by providing an optimum flight path response to pilot commands through the pitch-command stick controller (single control input), with response characteristics which are more easily perceived and predicted by the pilot. The improved performance is attained while providing for acceptable transient excursions in angle-of-attack and control surfaces relative to aerodynamic limits, in engine thrust (throttle) variations, and also in short-period attitude excursions and damping.

The precision approach control system of FIG. 3 as implemented in an X-29 aircraft automatically modulates the thrust through the throttle to hold the angle-of-attack of the aircraft constant and hence the airspeed constant. This provides the pilot with direct control over the aircraft's rate of change of the flight path angle at constant speed with the pitch-command center stick controller. Moreover, improved phugoid damping is obtained via thrust modulation, eliminating any tendency for an oscillatory flight path. Direct lift control is obtained with incremental flap motion upon stick movement, with the canard cancelling flap pitching moments with a flap canard interconnect. Other systems, such as the F-14, use spoilers as the direct lift command controllers which would move with the center stick.

The precision approach control system of the present invention provides the pilot with a completely on-board control system for an aircraft, with all of the information on flight parameters being generated on-board the aircraft, and without the use of externally generated flight information such as an externally transmitted glide slope beam which is detected on the aircraft. The information on flight parameters for the present invention is generated by on-board strap down inertial sensors, and includes a measurement of V, the velocity vector of the aircraft which is generated directly from the inertial sensors, a measurement of NZ, the acceleration normal to the velocity vector V of the aircraft, and a measurement of the flight path angle $\gamma$, which can be generated directly from the inertial sensors or can be derived from other measurements by the inertial sensors.

Moreover, the precision approach control system of the present invention provides the pilot with a controller, wherein the magnitude of movement of the controller controls and is proportional to the rate of change of the flight path angle $\dot{\gamma}$, such that a given magnitude of movement for a given period of time results in a given change in the flight path angle, and after the pilot releases the controller back to a trim or neutral position, the aircraft maintains the flight path angle $\gamma$ constant at the changed flight path angle, despite gusts and turbulence surrounding the aircraft which might otherwise influence its flight path.

BRIEF DESCRIPTION OF THE DRAWINGS

The foregoing objects and advantages of the present invention for an aircraft precision approach control system may be more readily understood by one skilled in the art with reference being had to the following detailed description of a preferred embodiment thereof, taken in conjunction with the accompanying drawings, wherein like elements are designated by identical reference numerals throughout the several views, and in which:

FIG. 2 is a functional block diagram of a PAC outer loop control system pursuant to the subject invention;

FIG. 3 is a functional block diagram of a PAC modified auto throttle system in accordance with the present invention.

DETAILED DESCRIPTION OF THE DRAWINGS

Figure 1:
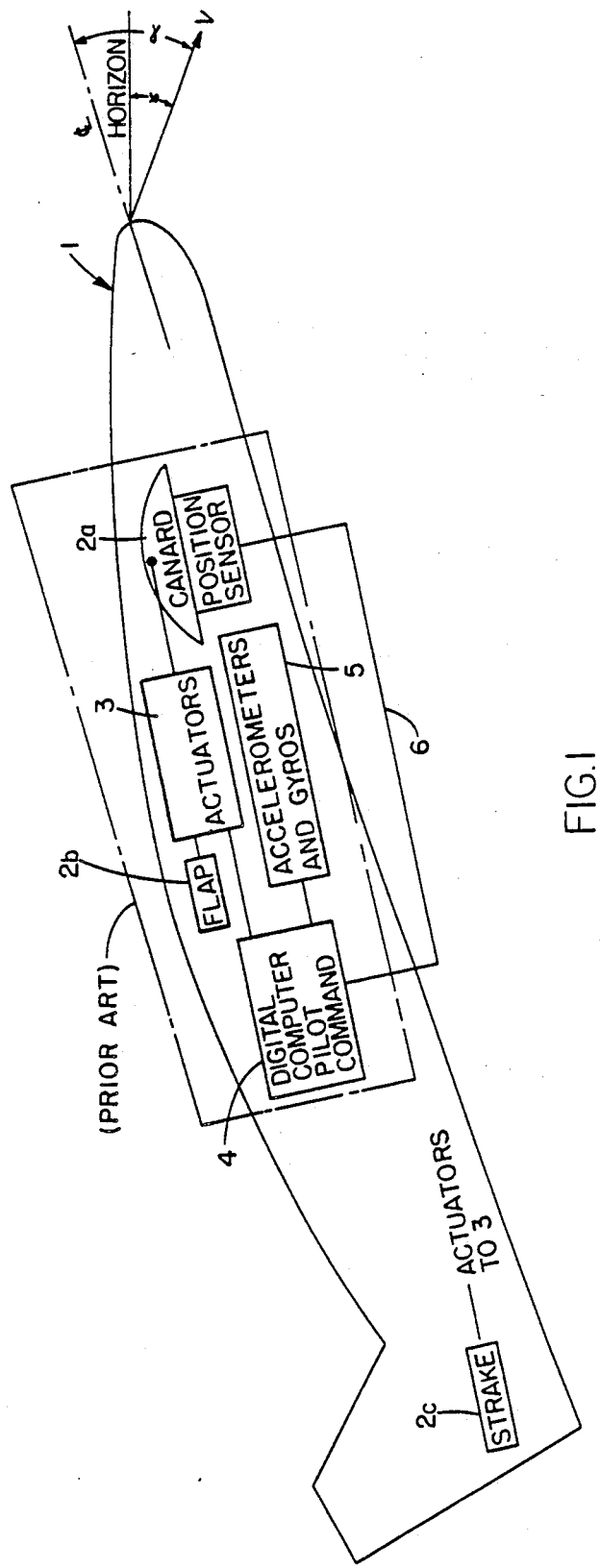
FIG. 1 is a schematic illustration of an exemplary embodiment of a canard-equipped aircraft, such as the Grumman X-29, which can be operated in a PAC mode of operation pursuant to the teachings of the present invention.

Referring to the drawings in detail, FIG. 1 illustrates a canard-equipped aircraft, such as the Grumman X-29 aircraft, and illustrates in a schematic manner an aircraft having a canard control surface 2a, a wing flap control surface 2b, and a strake flap 2c, all of which are employed in the X-29 jet aircraft. Actuators 3 variably position the control surfaces 2a, 2b and 2c. A flight control digital computer 4 of known design has a number of inputs thereto including pilot command inputs, and data inputs from accelerometers and gyros, collectively referred to by reference numeral 5. The X-29 control system employs known components and subsystems to achieve stability for an inherently unstable aircraft by multi-control surfaces.

FIG. 1 also illustrates on the right side thereof the centerline $\phi$ of the aircraft, the horizon, the velocity vector V of the aircraft, the flight path angle $\gamma$ of the aircraft, and the angle of attack $\alpha$ of the aircraft, all as are well known in the art.

It should be realized that the PAC mode of operation is applicable to many different types of aircraft other than the canard-equipped aircraft of FIG. 1. Moreover, the particular design of a PAC system for a particular type of aircraft will depend to a large extent on the operating and control systems already existing onboard that aircraft, and the extent to which the design can be implemented from an existing design or from an original design.

The following description is specifically with reference to a PAC system implemented in a Grumman X-29 aircraft. Upon engagement of the PAC mode, a PAC mode light indicator in the cockpit is energized. If the speed stability mode which is part of normal power approach had been previously selected by the pilot, the speed stability switch will go off. If speed stability is automatically engaged because the aircraft speed is below 148 Kts. when the PAC mode is selected, speed stability will also disengage. Disengagement of the PAC mode and reversion back to the normal power approach mode can be achieved by overriding the throttle motion with a pilot force in excess of eight pounds. Upon disengagement, a PAC solenoid held switch will disengage. Re-engagement of the PAC mode can be achieved only by pilot action through reselecting the PAC mode via the PAC switch. The PAC mode will also be disengaged upon closure of a weight on wheels switch on the aircraft.

The operational procedure to engage the PAC mode is to first engage the normal/PA mode (flap handle in MCC, thumbwheel switch—TW=9). Next, the boost switch and autothrottle is engaged, and then the PAC switch is engaged. The trim button is then operated to stop any motion of the rate-of-climb needle ($\dot{h}$). Further trim control should not be needed thereafter. This function would only be required on the X-29 design. The desired rate of change of the flight path angle is then controlled by operation of the stick controller.

FIG. 2 illustrates a functional block design of one embodiment of a precision approach control outer loop control system, which illustrates the control systems of the longitudinal control surfaces. Referring to the left side of FIG. 2, a $\delta$ stick command signal from the controller is multiplied at 20 by a gravity constant G divided by the aircraft speed CAPV to obtain a signal GAMDL, which is then multiplied at 22 by a constant representing the stick gear gain to obtain a $\dot{\gamma}$ command signal. This multiplication is used because the stick throw was originally scaled for incremental load factor (DNZ). An upper control branch multiplies the $\dot{\gamma}$ command signal by a constant at 24 to provide a lead of the $\delta$ stick command signal.

A DNZ signal ($DNZ_{Body} \cos \phi \cos \theta$) (wherein $\phi$ is the vehicle bank angle and $\theta$ is the vehicle attude angle) represents a feedback signal, which is also multiplied at 26 by the same constant as at 20 to provide a $\gamma$ actual signal, which is then summed at 28 with the $\gamma$ command signal. The $\gamma$ signal could also be obtained directly from an inertial navigation system, when available onboard the aircraft. The output of 28 is integrated at 30 to obtain an integrated signal which is multiplied by a constant at 32. The actual signal is also multiplied by a constant at 34 to provide damping and stability. The three signals from 24, 32 and 34 are then summed at 36 to obtain a PAC command signal.

A Q signal, representing the pitch rate of the aircraft, is also directed to a washout filter multiplier 38, which stabilizes the signal to zero at steady state, and the output thereof is then multiplied by a constant at 40 to provide additional damping. The output thereof is summed at 42 with the PAC command signal from 36 to provide a PAC inner loop pitch rate command signal. This signal is then applied the existing X-29 inner control loop 43 of the X-29 aircraft, and the output thereof is applied to a summing circuit 50.

The $\gamma$ command signal from 22 is also multiplied by a constant at 44 and directed through a limit circuit 46, which provides position limits of $\pm 2°$ to provide a $\Delta$ flap command signal. The $\Delta$ flap command signal is then multiplied by a constant at 48 to provide a DC PAC signal which is summed at 50 with the PAC mode signal from 42 to provide a canard command signal.

A primary flap command signal from the pilot is also summed at 52 with the $\Delta$ flap command signal from 46 to provide a $\delta$ total flap command signal for the Grumman X-29 aircraft.

FIG. 3 is a functional block diagram of the X-29 auto throttle system modified for the PAC mode of operation. An $\alpha$ ref signal, representing 8.75° for the X-29, is summed at 60 with a $\alpha$ signal representing the actual angle of attack of the aircraft. The resultant $\Delta\alpha$ signal is multiplied by a constant at 62 to obtain a $\kappa\Delta\alpha$ signal which is multiplied by a further constant at 64, integrated at 66, and limited at 68 to obtain a TD thrust signal.

A DNZ signal is also multiplied by a constant at 70, and then multiplied at 72 by the $\cos(|\phi|)+30°$, wherein $\phi$ is the bank angle of the aircraft, the output of which is summed at 74 with the $\kappa\Delta\alpha$ signal from 62. The output of 74 is then fed through a lag (1 sec. for the X-29) filter 76 to produce a TE signal.

A $\delta$ stick command signal is also multiplied by a constant at 78, the output of which is fed through a 10 second washout filter 80 to provide a TF signal, which is summed at 82 with the TD and TE signals to provide an incremental thrust signal. The incremental thrust signal is multiplied at 84 to provide an incremental power lever signal.

A pilot thrust command signal (before PAC) is then summed at 86 with the incremental power signal, and the output thereof is limited at 88 to provide limits for the PAC power lever command signal at 90 for the X-29 aircraft.

As illustrated by FIGS. 2 and 3, the PAC system and autothrottle represent completely on-board control systems for an aircraft, with all of the information on flight parameters being generated on-board the aircraft, and without the use of externally generated flight information such as an externally transmitted glide slope beam which is then detected on the aircraft. The information on flight parameters for the present invention is generated by on-board strap down inertial sensors, and includes a measurement of V, the velocity vector of the aircraft which is generated directly from the inertial sensors, a measurement of NZ, the acceleration normal to the velocity vector V of the aircraft, and a measurement of the inertial flight path angle $\gamma$, which can be generated directly from the inertial sensors or can be derived from other measurements by the inertial sensors.

Figure 4:
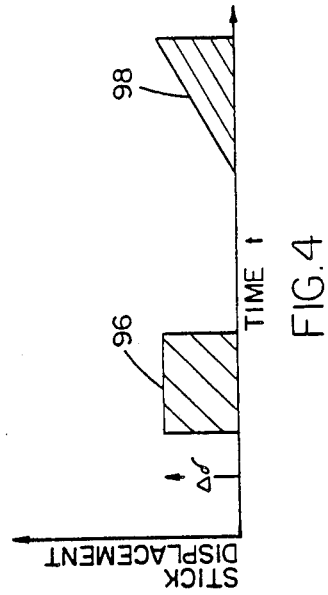
FIG. 4 is a graph illustrating the displacement of the PAC control stick as a function of time, and illustrates two types of control stick movement, and the resultant $\Delta\gamma$ represented by the area under each curve.

FIG. 4 is a graph illustrating the displacement of the PAC control stick as a function of time, and illustrates two types of control stick movement, and the resultant $\Delta\gamma$ is represented by the area under each curve. In the pilot control movement represented by curve 96, the PAC control stick is displaced a given magnitude $\Delta\delta$ for a given time period, and the shaded area under curve 96 represents the total change in $\gamma(\Delta\gamma)$ resulting from that stick displacement. In the pilot control movement represented by curve 98, the pilot gradually displaces the PAC control stick until a given magnitude $\Delta\delta$ is reached, and then releases the control stick back to its trim or neutral position, and the resultant $\Delta\gamma$ is represented by the shaded area under curve 98.

In summary, the magnitude of the displacement of the controller is proportioned to the rate of change of the flight path angle $\gamma$, such that a given magnitude of movement for a given period of time results in a given change in the inertial flight path angle ($\Delta\gamma$), and after the pilot releases the controller back to a trim or neutral position, the aircraft maintains the flight path angle $\gamma$ constant at the changed flight path angle $\gamma$, despite gusts and turbulence surrounding the aircraft which might otherwise influence its flight path.

In summary, FIG. 2 illustrates a functional block diagram of the control laws commanding the longitudinal control surfaces, and FIG. 3 illustrates a functional block diagram of the control laws commanding the autothrottle.

The control law is a $\dot{\gamma}$ command, $\gamma$ hold, with the autothrottle holding $\alpha$. In order to maintain an adequate stall margin for the aircraft, the speed is increased in banked turns.

While one embodiment of the present invention for a precision approach control system is described in detail herein along with several variations thereon, it should be apparent that the disclosure and teachings of the present invention will suggest many alternative designs to those skilled in the art.

What is claimed is:

1. A precision approach control system for an aircraft during landing, comprising:
    a said aircraft having a plurality of operating control surfaces thereon;
    b. on-board strap down inertial sensors on the aircraft for generating or allowing the derivation of flight path parameter information required by the precision approach control system, including a measurement of V the velocity vector of the aircraft, a measurement of NZ the acceleration of the aircraft normal to the velocity vector V of the aircraft, and a measurement of the aircraft flight path angle $\gamma$;
    c. an autosystem, responsive to output signals from said on-board strap down inertial sensors and angle of attack, for maintaining the aircraft at a predetermined angle of attack during landing thereof;
    d. a control system, responsive to output signals from said on-board strap down inertial sensors, for maintaining the inertial flight path angle of the aircraft constant during landing thereof; and
    e. a controller, operated by the pilot, for adjusting said control system for controlling the rate of change of the flight path angle of the aircraft, with the magnitude of movement of the controller being proportioned to the rate of change of the flight path angle $\dot{\gamma}$ of the aircraft, such that a given magnitude of movement for a given period of time results in a given change in the flight path angle $\gamma$, and after the pilot releases the controller back to a trim or neutral position, the aircraft maintains the flight path angle $\gamma$ constant at the changed flight path angle, despite gusts and turbulence surrounding the aircraft which might otherwise influence its flight path.

2. A precision approach control system for an aircraft as claimed in claim 1, said controller for the aircraft comprising the normal pitch rate command stick controller during a power approach landing, which is converted to a flight path angle rate controller in control.

3. A precision approach control system for an aircraft as claimed in claim 1, said autosystem comprising an autothrottle system which controls the power lever of the aircraft.

* * * * *

UNITED STATES PATENT AND TRADEMARK OFFICE
CERTIFICATE OF CORRECTION

PATENT NO. : 5,000,404

DATED : March 19, 1991

INVENTOR(S) : Romeo P. Martorella

It is certified that error appears in the above-identified patent and that said Letters Patent is hereby corrected as shown below:

Column 4, line 51: " $\phi$ " should read as -- $\mathcal{C}$ --

Column 5, lines 42, 43 & 44: " $\gamma$ " should read as -- $\dot{\gamma}$ --

Column 5, line 59: "applied the" should read as --applied to the--

Column 5, line 62: " $\gamma$ " should read as -- $\dot{\gamma}$ --

Column 6, line 65: " $\gamma$ " should read as -- $\dot{\gamma}$ --

Signed and Sealed this

Nineteenth Day of January, 1993

Attest:

DOUGLAS B. COMER

*Attesting Officer*     *Acting Commissioner of Patents and Trademarks*